United States Patent
Gandolph et al.

(10) Patent No.: US 9,269,153 B2
(45) Date of Patent: Feb. 23, 2016

(54) SPATIO-TEMPORAL CONFIDENCE MAPS

(71) Applicant: THOMSON LICENSING, Issy de Moulineaux (FR)

(72) Inventors: Dirk Gandolph, Ronnenberg (DE);
Joern Jachalsky, Wennigsen (DE);
Wolfram Putzke-Roeming, Hildesheim (DE); Markus Schlosser, Hannover (DE)

(73) Assignee: THOMSON LICENSING, Issy Les Moulineaux (FR)

( * ) Notice: Subject to any disclaimer, the term of this patent is extended or adjusted under 35 U.S.C. 154(b) by 180 days.

(21) Appl. No.: 14/057,917

(22) Filed: Oct. 18, 2013

(65) Prior Publication Data

US 2014/0153784 A1   Jun. 5, 2014

(30) Foreign Application Priority Data

Oct. 18, 2012 (EP) ..................... 12306290
Dec. 19, 2012 (EP) ..................... 12306623

(51) Int. Cl.
*G06T 7/00* (2006.01)
*G06T 7/20* (2006.01)

(52) U.S. Cl.
CPC ............ *G06T 7/0075* (2013.01); *G06T 7/2006* (2013.01); *G06T 2207/10021* (2013.01)

(58) Field of Classification Search
None
See application file for complete search history.

(56) References Cited

U.S. PATENT DOCUMENTS

2010/0315505 A1* 12/2010 Michalke et al. ............. 348/118
2012/0262543 A1* 10/2012 Lee et al. ....................... 348/43

FOREIGN PATENT DOCUMENTS

EP       2511875       10/2012

OTHER PUBLICATIONS

B. Lucas and T. Kanade: An Iterative Image Registration Technique with an Application to Stereo Vision, Proceedings of the 7th International joint conference on Artificial intelligence (IJCAI'81) (1981), pp. 674-679.
S. Mattoccia and L. De-Maetzu; A Discussion on the Accuracy and Performance of Local Stereo Algorithms for Stereo Correspondence; Multimedia Communications Technical Committee, IEEE Communication Society, E-Letter, vol. 6, No. 6, Jun. 2011.
D. Scharstein and R. Szeliski; A taxonomy and evaluation of dense two-frame stereo correspondence algorithms, International Journal of Computer Vision 47(1-3): 7-42. 2002.
D. Sun, S. Roth. J. P. Lewis, and M. J. Black: fiLearning Optical Flowfi, European Conference on Computer Vision (ECCV)(2008), pp. 83-97.
D. Sun, Stefan Roth, M. J. Black: Secrets of optical flow estimation and their principles, IEEE Conference on Computer Vision and Pattern Recognition (CVPR)(2010), pp. 2432-2439.

(Continued)

*Primary Examiner* — Siamak Harandi
(74) *Attorney, Agent, or Firm* — Tutunjian & Bitetto, P.C.

(57) ABSTRACT

A method and an apparatus for generating a confidence map for a disparity map associated to a set of two or more images are described. Motion between at least two subsequent sets of two or more images is determined. Based on the determined motion information static and dynamic regions in the images of the sets of two or more images are detected and separated. A disparity change between a disparity value determined for a static region of a current image and a motion compensated disparity value of a previous image is determined. The result of the determination is taken into account for generating or refining a confidence map.

8 Claims, 12 Drawing Sheets
(1 of 12 Drawing Sheet(s) Filed in Color)

(56) References Cited

OTHER PUBLICATIONS

K. Yoon and I. Kweon; Adaptive Support-Weight Approach for Correspondence Search, IEEE Transactions on Pattern Analysis and Machine Intelligence (TPAMI), Apr. 2006, vol. 28, No. 4, pp. 650-656.
S. Baker et.al.; A Database and Evaluation Methodology for Optical Flow; International Journal of Computer Vision. 92(1):1-31, Mar. 2011.
J. L. Barron, D. J. Fleet and S. S. Beauchemin; Performance of Optical Flow Techniques; Technical Report TR299, 1994.
M. J. Black and P. Anandan: A framework for the robust estimation of optical flow, Fourth International Conference on Computer Vision (ICCV)(1993), pp. 231-236.
G. Blanchet et. al.; Fattening free block matching; Journal of Mathematical Image and Vision, (109-121) 2011.
T. Brox, A. Bruhn, N. Papenberg, and J.Weickert: High accuracy optical flow estimation based on a theory for warping, European Conference on Computer Vision (ECCV)(2004), pp. 25-36.
A. Bruhn, J. Weickert and C. Schnörr: Lucas/Kanade meets Horn/Schunck: combining local and global optical flow methods, International Journal of Computer Vision vol. 61 (2005), pp. 211-231.
M. A. Gennert and S. Negahdaripour; Relaxing the brightness constancy assumption in computing optical flow; MIT AI Lab. Memo No. 975, 1987.
H. Hirschmüller and D. Scharstein ; Evaluation of stereo matching costs on images with radiometric differences; IEEE Transactions on Pattern Analysis and Machine Intelligence, 31(9): 1582-1599. Sep. 2009.
B.K.P. Horn, Brian G. Schunck: Determining Optical Flow, Artificial Intelligence Magazine vol. 17 (1981), pp. 185-203.
X. Hu and P. Mordohai; Evaluation of Stereo Confidence Indoors and Outdoors; IEEE Conference on Computer Vision and Pattern Recognition; Jun. 13-18, 2010.
J. Jachalsky, M. Schlosser and D. Gandolph; Confidence evaluation for robust, fast-converging disparity map refinement; IEEE International Workshop on Hot Topics in 3D. 2010.
Anonymous, "Enpeda Image Sequence Analysis Test Site", http://web.archive.org/web/20120219232714/http://www.mi.auckland.ac.nz/, Feb. 19, 2012, pp. 1-2.
Richardt et al., "Real-time Spatiotemporal Stereo Matching Using the Dual-Cross-Bilateral Grid", http://web.archive.org/web/20100821082355/http://www.cl.cam.ac.uk/research/rainbow/projects/, Aug. 21, 2010, pp. 1-2.
Wedel et al., "Detection and Segmentation of Independently Moving Objects from Dense Scene Flow", 7th International Conference on Energy Minimization Methods in Computer Vision and Pattern Recognition, Bonn, Germany, Aug. 24, 2009, pp. 14-27.
Deng et al, "Fast Motion and Disparity Estimation With Adaptive Search Range Adjustment in Stereoscopic Video Coding", IEEE Transactions on Broadcasting, vol. 58, No. 1, Mar. 2012, pp. 24-33.
Chessa et al., "A Fast Joint Bioinspired Algorithm for Optic Flow and Two-Dimensional Disparity Estimation", Computer Vision Systems. Proceedings 7th International Conference, ICVS 2009, Springer-Verlag, Berlin, 2009, pp. 184-193.
Wedel et al., "Stereoscopic Scene Flow Computation for 3D Motion Understanding", International Journal of Computer Vision, vol. 95, No. 1, Oct. 2011, pp. 29-51.
Wedel, A., "3D Motion Analysis via Energy Minimization", Doctoral Dissertation in Mathematics, University of Bonn, Germany, Oct. 16, 2009, pp. 1-129.

\* cited by examiner

SPATIO-TEMPORAL CONFIDENCE MAPS

This application claims the benefit, under 35 U.S.C. §119 of European Patent Application 12306290.3, filed Oct. 18, 2012 and European Patent Application 12306623.5, filed Dec. 19, 2012.

FIELD OF THE INVENTION

The invention relates to a method and an apparatus for generating a confidence map for a disparity map associated to a sequence of sets of two or more images. More specifically, the invention addresses the generation of confidence maps making use of spatio-temporal information available for stereo or multi-view sequences.

BACKGROUND OF THE INVENTION

In the emerging market of 3D TV, 3D video, and 3D cinema, many applications require depth information, but their demands concerning the density, accuracy, and reliability of the depth maps differ widely. Therefore, it is beneficial to supplement a disparity map with a confidence map that reflects the reliability of the individual disparity estimates.

One application are VFX (visual effects) using the depth information to model the final scene by combining CGI generated and camera generated movie components. This requires reliable depth information, which preferably is prepared and provided together with the movie. Otherwise a cost-intensive and hand crafted process has to be utilized to generate depth information.

For the computation of depth information from a set of two or more images a matching process is applied to find point correspondences between input images. The displacement between two corresponding points is referred to as disparity. The 3D structure of a scene can be reconstructed from these disparities through triangulation if the camera parameters are known.

A correct and safe exploitation of depth information in video productions depends directly on the quality of disparity estimation generated for stereoscopic or multi-view video sequences. The quality of the calculated depth maps, however, is not at all homogeneously distributed and includes defects whenever the underlying disparity estimation model has been injured. Rapid scene object movements, foreground background occlusions, and missing or periodically structured textures visible in the scenes are some of the well-known origins of flaws in disparity estimation results causing unavoidable quality deficits. Thus, additional information is required to support the expedient application of the gained disparity information.

The mean to indicate possible quality risks is linked to every disparity value and is provided by the disparity confidence values. High confidence values associated with a disparity indicates a safe usage while a low confidence value means the opposite. Selecting depth information from a depth map by making no restrictions to the quality risk in choosing a low threshold for the confident value will result in a dense perhaps complete depth map but will contain many errors. If, in the opposite way, the threshold for the confidence request is increased and only the disparities associated with high confidence are selected the resulting depth map will become sparsely populated but, therefore, more reliable.

The performances of the confidence measures have not been broadly analyzed so far. One reason may be the assumption that a change in the confidence value does not have any effect on the disparity information and that the primary goal must be to improve quality of the disparities. At the other side it is evident that disparity estimation will always be erroneous and that information is urgently needed indicating the locations where this comes true. It is also worth to consider the aspect that the additional confidence information can be used in further post-processing steps for the improvement of the depth maps by adequate modifications.

A state of the art confidence calculation, which combines consistency, visibility, and matching errors to model the reliability state, is described in EP 2 511 875.

SUMMARY OF THE INVENTION

It is an object of the present invention to propose a solution for generating further improved confidence maps for disparity maps associated to sets of two or more images.

According to the invention, a method for generating a confidence map for a disparity map associated to a sequence of sets of two or more images comprise the steps of:
- determining motion between at least two subsequent sets of two or more images;
- detecting and separating static and dynamic regions in the images of the sets of two or more images based on the determined motion information;
- determining a disparity change between a disparity value determined for a static region of a current image and a motion compensated disparity value of a previous image; and
- taking the result of the determining step into account for generating or refining a confidence map.

Accordingly, an apparatus for generating a confidence map for a disparity map associated to a sequence of sets of two or more images comprises:
- a motion determining unit configured to determine motion between at least two subsequent sets of two or more images;
- a region detector and separator configured to detect and separate static and dynamic regions in the images of the sets of two or more images based on the determined motion information;
- a determining unit configured to verify a disparity change between a disparity value determined for a static region of a current image and a motion compensated disparity value of a previous image; and
- a confidence map generator configured to take the result obtained by the determining unit into account for generating or refining a confidence map.

The invention proposes to supplement disparity/depth maps with a single confidence map that reflects all the available information concerning the reliability of each estimate including the spatio-temporal information available for stereo or multi-view sequences. Known solutions did only incorporate spatial aspects and did neglect any temporal caused influences upon the input data. The temporal change within the data sets is analyzed by means of the additional introduced flow estimation, where the flow maps describe the amount and the orientation of scene objects and scene movements. The flow information can be used to track scene objects in time by applying flow compensation and it allows for the detection of motion which may be related to scene objects or global camera motions.

Besides the question about advantages and the expected benefits the state of the art for confidence calculation had been limited to frame-based methods by investigating only images captured at the same time. Analyzing the spatio-temporal disparity widens the knowledge base and allows improvements for the precision in confidence calculation by approving or removing the previously vaguely taken decisions, which leads to an improving momentum in the robustness for the confidence map.

The motion information is used to detect and to separate between 'static' and 'dynamic' regions (segments) in the images by applying a threshold on the vector field. The static image regions are those with no or very small motion and the dynamic regions are those with large motion components.

The confidence determination within the static image regions is advantageously improved in different ways:
(1) The direct application within the confidence calculation;
(2) Post-processing of the confidence map; and
(3) The combination of solution (1) and (2).

All solutions verify the temporal disparity stability, which is the difference between the disparity determined for the current frame and the flow compensated disparity value of the previous frame. The disparity change for static regions needs to be zero or at least very small.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

BRIEF DESCRIPTION OF THE DRAWINGS

The patent or application file contains at least one drawing executed in color/high definition. Copies of this patent or patent application publication with color/high definition drawings will be provided by the office upon request and payment of the necessary fees.

DETAILED DESCRIPTION OF PREFERRED EMBODIMENTS

Figure 1:
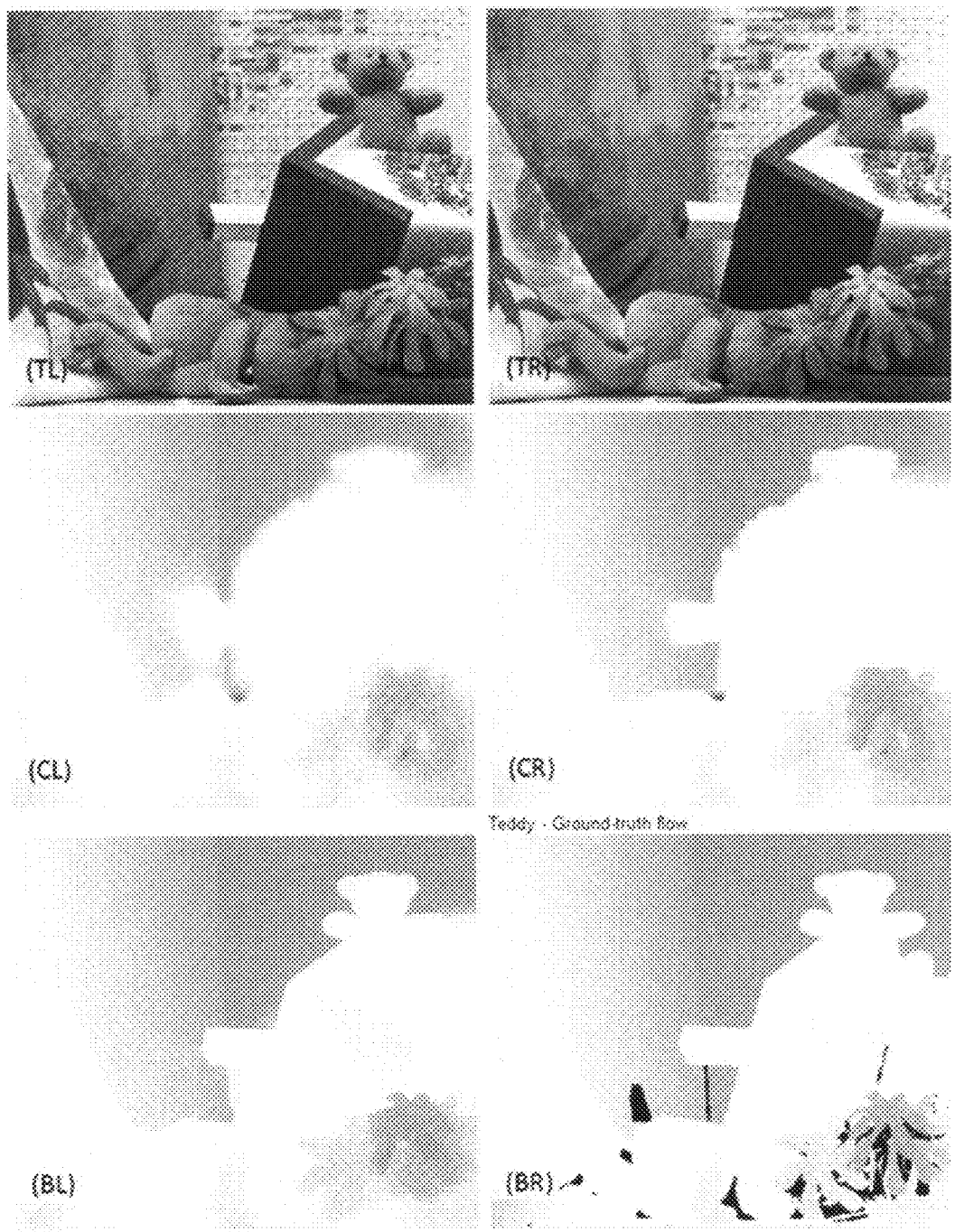
FIG. 1 shows grey-value encoded flow vectors for 'Teddy' from the Middlebury datasets.

In the following the invention is explained in the frame of stereo matching. Stereo matching is a general approach for any set of related images. It is not only employed for simultaneously captured images of a stereo or multi-view camera system, but also for a sequence of images stemming from a single camera. Other applications relying on stereo matching are motion estimation, video coding, 2D-to-3D conversion, frame rate or scan rate up-conversion, SD-to-HD up-conversion, etc.

The development of spatio-temporal confidence calculation has been conducted within a framework providing a fixed data set. The set consists of sequences containing stereo images, disparity values, flow information, and ground truth data. All set data have been determined once in advanced and used throughout all consistency calculations.

Artificial stereo sequences provided by [1] and [2] served as origin test materials. A prerequisite for the material selection has been the availability of ground truth data and both sources hold different test sequences including the ground truth data for the disparities, which are available not only for single stereo images but for all pictures in the sequences. The remaining data of the set as flow information and disparity maps were estimated independently for each test sequences by applying state of the art algorithms as explained in details within the subsequent description.

The ground truth disparities served to review the different approaches examined for calculating the confidence values. They allow a compliance prove between the calculated confidence values and the real present disparity errors.

A large range of different disparity estimation algorithms have been proposed within the recent years, which can be categorized by distinguishing between different matching cost criteria and between global and local optimization. One proposal using adaptive support weights (ASW) in matching windows unified the local with global matching criteria and opened the way to improve the disparity estimation by allowing large matching windows while avoiding the so called fattening effect appearing for object borders. A question not answered by the ASW approach was an optimal set of weight parameters and suitable optimization criteria.

The ASW uses two weights regulating the influence of each window pixel deviation against the window center pixel. Weighted are the color similarity and the spatial distance using independent weighting parameters for each. Having applied the weighting the differences are accumulated in the matching window using a cost criterion.

Utilizing the results of previously executed extensive investigations for finding the optimal settings allowed an estimation of disparity maps which are ground truth consistent with an error not larger than 1 pixel in 90%. The figure mentioned is an average value over three different sequences with 40 frames each. The following equations show the details of the applied optimization criteria combined with the ASW approach. The disparity estimation has been done in full search and the winner takes all mode:

$$tZSAD[x; d] = \frac{\sum_{x_i} \cdot \text{Min}\left(\left|\begin{array}{c} w_{12}(x_i, d) \cdot Y_1(x_i) - \overline{Y}_1 - \\ w_{12}(x_i, d) \cdot Y_2(x_i + d) + \overline{Y}_2 \end{array}\right|; T\right)}{\sum_{x_i} w_{12}(x_i, d)} \quad (i)$$

$$w_{12}(x_i, d) = w_{g12}(x_i, d) \cdot w_{c12}(x_i, d) \quad (ii)$$

with $w_g(p, q) = \exp(-\Delta g_{pq}/\gamma_g)$ and $w_c(p, q) = \exp(-\Delta c_{pq}/\gamma_c)$.

Equation (i) describes the truncated zero-mean sum of absolute differences aggregated over the matching window for pixel x and disparity d, and equation (ii) the combined weighting function $w_{12}$. The influences of color deviation c and center pixel proximity g are controlled by separate Laplacian deviation parameters γ dividing each of the Euclidian distance measures Δ within the Euler function.

The estimation of flow information required the selection as well as the development of flow estimation algorithms and software.

The optical flow approach was presented first in 1980 from Horn and Schunck [3], making two assumptions for the image sequence. They proposed that light changes are absent in the images as the time difference between the images is short. Thus it is assumed that every pixel has constant RGB values. The second assumption refers to the smoothness in the velocity flow being justified with the temporal short distance. The motion vector estimates showed weaknesses for large motions and errors for images with illumination changes.

An approach proposed from Lucas and Kanade [4] did overcome the limited motion estimation range by applying it iteratively. They achieved a solution well suited for sparse tracking techniques. Nowadays their algorithm is still used in a pyramidal frame work where the initial estimation is done on down sampled images which are scaled up in later iterations. The hierarchy of a pyramidal solution has the additional advantage to reduce the overall processing time.

An approach from Black and Anadan [5] published in 1993 excludes outliers form the estimation process by modifying the algorithm from Horn and Schunck using quadratic, truncated quadratic, and Lorentzian weighting estimators. They succeed in creating dense optical flow maps but had to pay with a processing intensive solution which is used still for expensive movie productions.

Different initiatives worked on an improvement of the comparability for estimation results generated at different places. A taxonomy for motion vector evaluation was defined and a database containing test materials was set up. This was initially done for temporal motion estimation and followed by a finer taxinomy for optical flow sequences including ground truth maps.

A paper published by Bruhn et al. [6] specifies a mathematical unification of the two established solutions in optical flow motion estimation comparing strengths and weaknesses observed for global and local estimation approaches and proposes a new combination of the two solutions to receive the best possible outcome.

Software selection started with the inspection of results provided by the Optical Flow Database from Middlebury [7] to select a good performing and proper algorithm. Currently the database shows a ranking of 65 different algorithms (partly anonymous), which are tested across eight image sources.

The number of Lucas-Kanade based algorithms is vanishingly small and is represented by only a single candidate using a pyramid approach. The pyramid Lucas-Kanade algorithm is referred to as '(2) Pyramid LK' at the Middlebury data database. The reason for the small representation may be the sparse (although often reliable) motion fields created by these algorithms. Within the Middlebury ranking the Pyramid LK performance constantly remains at the last place.

This is different for Horn-Schunck algorithms tested in the Middlebury database, which correspond to the papers [3], [8], [9], [10] and [6]. As the Middlebury naming is different from the naming used here a cross-correspondence is given in the first column of the following table.

TABLE 1

Performance examples taken from the Middlebury Optical Flow Page http://vision.middlebury.edu/flow/

| | | | Error type | | | |
|---|---|---|---|---|---|---|
| Paper | Middlebury algorithm | Time | Endpoint | Angle | Interpolation | Normalized interpolation |
| | | | | | Average rank | |
| [3] | (3) Horn & Schunck | 49 | 53.10 | 54.70 | 32.30 | 33.40 |
| [8] | (11) Learning Flow | 825 | 42.90 | 44.20 | 44.90 | 45.10 |
| [9] | (31) Classic + NL | 972 | 13.10 | 12.90 | 30.90 | 29.80 |
| [10] | (5) Brox et al. | 18 | 32.50 | 31.60 | 18.10 | 24.20 |
| [6] | (1) 2D-CLG | 884 | 50.00 | 47.40 | 31.80 | 36.00 |
| top | (40) MDP-Flow2 | 420 | 7.60 | 9.30 | 8.00 | 8.70 |

Table 1 also contains some performance results measured by the Middlebury tests. The free available and thus preferred flow estimation algorithms [9] and [10] rank in the first half range. This is not a very best position, but the performance of a top performer as for example (40) MDP-Flow2 is an anonymous algorithm and thus can only be studied in excerpts from a paper.

According to the Middlebury ranking analyzed within the previous figure, the software implementation of the most promising algorithm Sun et al. [9] and Brox et al. [10] have been downloaded and tested. However, the outcome of this attempt was not successful in the second case because the results generated from [10] could not be used. Due to a variable scaling of the image field dimensions as well as another unknown scaling applied to the motion vectors itself this implementation had to be skipped.

The flow estimation executed with the code from the Computer Science Department of the Brown University [9], on the other hand, was highly successful. It comprises three independent implemented optical flow estimations and allowed to compare the optical flow estimation according to algorithms proposed by Horn and Schunck [3], Black and Anandan [5], and Sun et al. [9].

FIG. 1 shows the estimation created with frames 10 (top left) and 11 (top right) of the well-known test images 'Teddy'. The images document the progress reached in quality following the evolvement of the algorithmic progress. While the Horn and Schunck algorithm (center left) generates very rough motion fields being freighted with superimposed noise and rather nebulous object borders, the Black and Anandan algorithm (center right) does already get better results. Although still not satisfying, the noise is reduced and the motion field yields more sharpness at the object borders. A visual better result is the outcome for the very last algorithm proposed by Sun et al. (bottom left), where the motion field does gain the best similarity with the ground-truth flow image (bottom right) that is aimed at.

Figure 2:
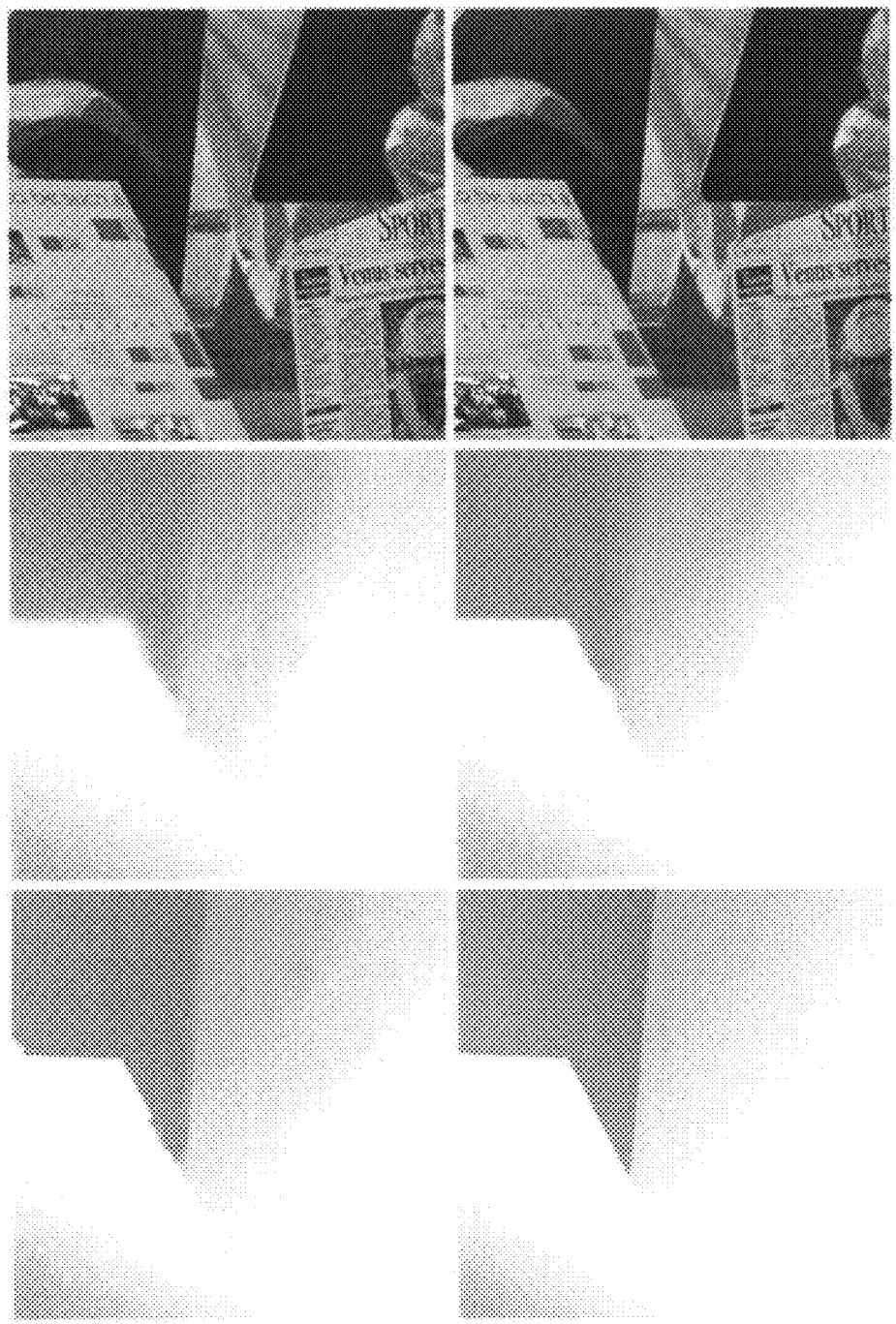
FIG. 2 shows grey-value encoded flow vectors for 'Venus' from the Middlebury datasets.
Figure 3:
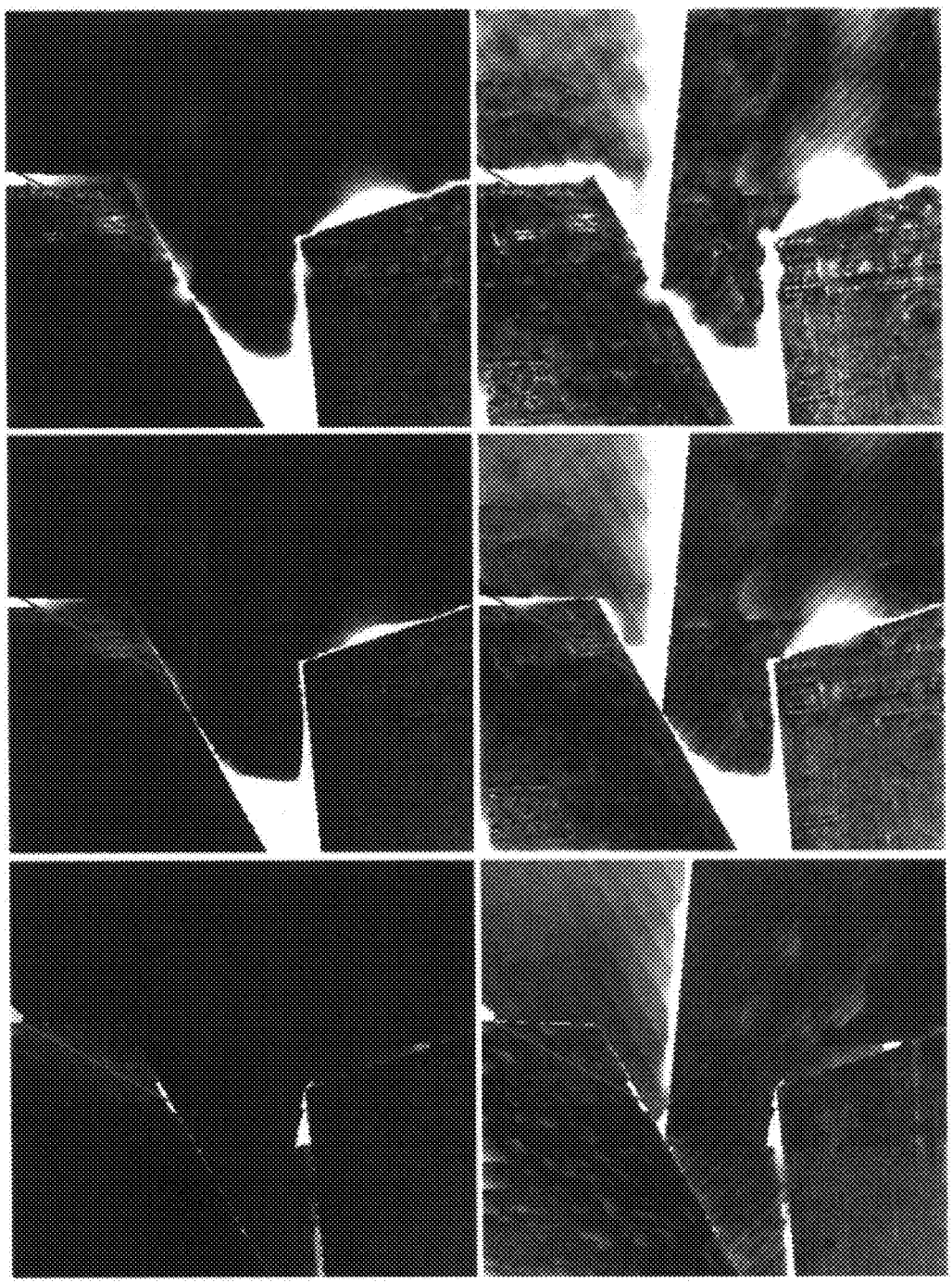
FIG. 3 shows Middlebury ground truth flow errors for 'Venus'.

The same comparison has been applied to a sequence also providing the ground truth flow. The quality of the results is depicted in FIG. 2, showing the grey-value encoded flow vector as in the figure before. By means of the ground truth data available for this example it is possible to visualize the estimation error as done in FIG. 3. The left column shows the absolute angle error (AE) in degree, which gets smaller with each progress in the algorithms, and the right column shows the end point error (EPE), which also gets smaller from top to bottom. The EPE is defined by the geometrical distance between the true flow vector and the estimated one.

Lighter image areas in the error pictures show larger errors and black pixels have no error. The related average error values, from top to bottom, AE=[9.4°; 7.8°; 3.3° ] and EPE= [0.55; 0.45; 0.23] confirm the visual findings as the values decrease starting with the Horn & Schunck algorithm, switching to the Black & Anandan and further to the Sun & Roth & Black algorithm.

Another important question investigated was the robustness of the tested algorithms. This was checked by means of a sequence containing rapid motions, i.e. large motions. The material used are some pictures taken from the movie Avatar in which a fighting robot is swinging a sword weapon and moves its top from the left to right side of the screen. This movement generates extreme motion vectors, but the Sun & Roth & Black algorithm masters this challenge.

Figure 4:
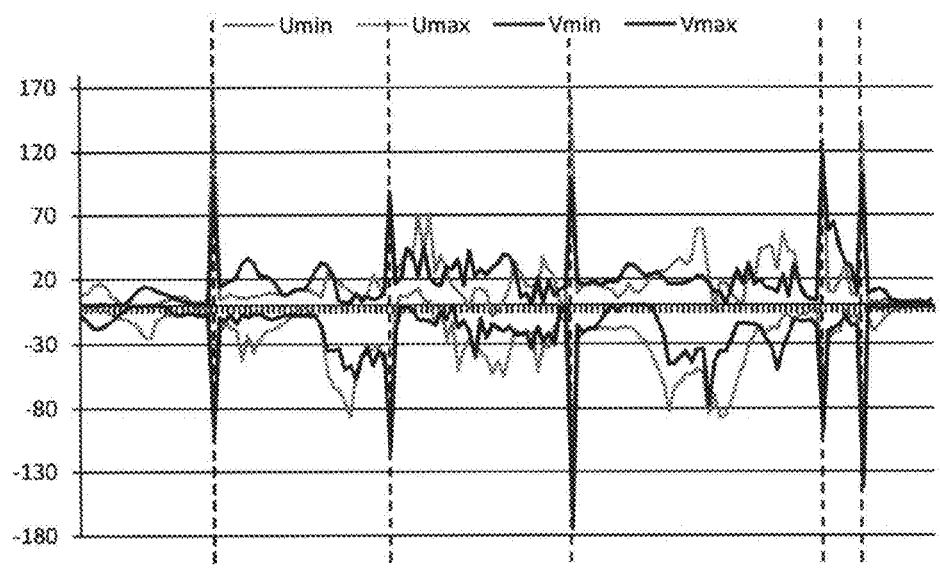
FIG. 4 shows Avatar motion vector maxima estimated with the so called Sun & Roth & Black algorithm for the frames 50 till 200.

FIG. 4 documents the outcome of this test by depicting the maximum values of the estimated motion vectors [u, v] given in its horizontal and vertical components. The maxima values are analyzed per picture depicting the motion range covered. The largest deflection marked with vertical dashed lines should be neglected, as they are caused by scene cuts and thus do not represent real object motions. The motion range covered excluding the scene cuts is around ±70 pixel, which is extreme and proves that the algorithm performs well and is able to cope with large motion values as well.

Figure 5:
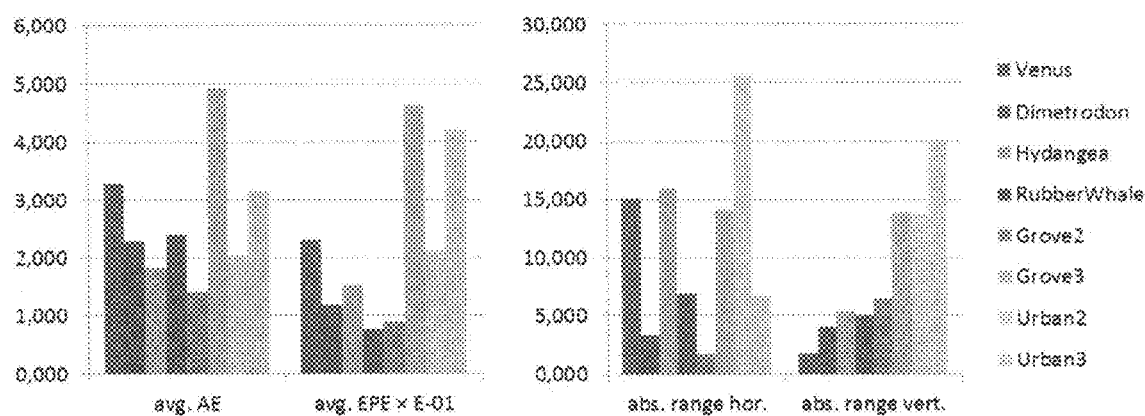
FIG. 5 shows the motion field errors and vector sizes for Middlebury training images when the Sun & Roth & Black flow estimation algorithm is applied.

A second test has been conducted by means of the ground truth data provided with so called training material at the Middlebury platform. These data are others than the official test images and thus cannot be used for a direct comparison in the ranking. Nevertheless they allow some assessment and generate an idea about the performance reached. The performance results created with the flow estimation algorithm [9] can be found in Table 2 and the average values, which are generated similar to the official Middlebury contest, are given in FIG. 5. The left part of FIG. 5 depicts the average angle and end point error, the right part the absolute motion vector range of the horizontal and vertical components.

The motion vector range in this second test may be much smaller than within the first one. But in some cases it is also difficult to estimate small motions correctly. This becomes visible for the image pair Dimetrodon, having small motions to estimate, where the flow estimation nevertheless generates relative large error rates.

TABLE 2

Summary of angle errors, end point errors, horizontal and vertical motion results from analyzed Middlebury training sequences when applying [9]

| | Angle Error (AE) | | End Point Error (EPE) | | horizontal motion u | Vertical motion v |
|---|---|---|---|---|---|---|
| | range | avg. | range | avg. | range | range |
| Venus | [0.003 144.71] | 3.289 | [0.001 6.339] | 0.232 | [−8.724 6.394] | [−1.268 0.553] |
| Dimetrodon | [0.001 36.782] | 2.28 | [0.000 2.449] | 0.117 | [−3.881 −0.571] | [−2.014 2.092] |
| Hydangea | [0.000 151.949] | 1.824 | [0.000 8.041] | 0.151 | [−5.622 10.415] | [−3.305 2.111] |
| RubberWhale | [0.002 127.067] | 2.401 | [0.000 5.776] | 0.076 | [−4.344 2.490] | [−2.302 2.719] |
| Grove2 | [0.001 81.413] | 1.410 | [0.000 5.612] | 0.089 | [−3.450 −1.691] | [−2.405 4.024] |
| Grove3 | [0.002 129.118] | 4.927 | [0.000 10.903] | 0.464 | [−2.282 11.808] | [−3.971 9.927] |
| Urban2 | [0.000 142.680] | 2.034 | [0.000 16.513] | 0.210 | [−21.200 4.373] | [−5.579 8.238] |
| Urban3 | [0.000 150.917] | 3.160 | [0.000 17.693] | 0.421 | [−3.454 3.264] | [−3.096 17.098] |

When comparing the average endpoint errors and average angle errors in the two Tables 1 and 2 it is clear that they have large differences. This can be explained with the different test materials used and also with the overall average calculation. It should be a reason to be more worried about if the results of the training material would have been much worse than those listed in the official Middlebury optical flow page contest.

The acquisition of appropriate test material providing ground truth data was solved by means of an extensive search on the web. Unfortunately the well-known Middlebury test material does only provide single pairs of stereo images, while the intended investigation requires a sequence of image pairs including the ground truth data for all disparities in the sequence. The search on the internet revealed two suitable sources, which are the universities of Auckland in New Zealand [1] and Cambridge in UK [2]. Both provide computer generated stereoscopic sequences and ground truth disparity maps with integer pixel accuracy. The ground truth data are very reliable as being computer generated as well, but there are not existing occlusion maps for all of the materials.

Figure 6:
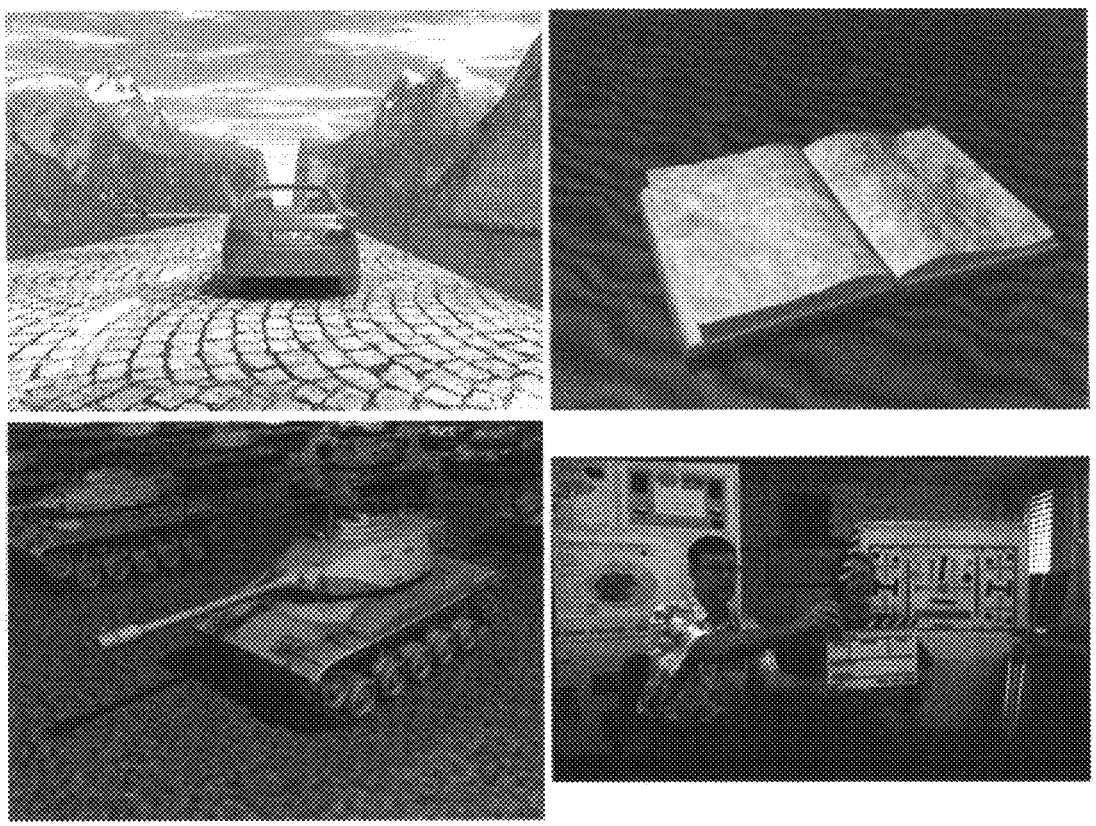
FIG. 6 shows images from four test sequences.

The quality of the artificial sequences is highly varying. Some sequence material was generated by applying very simple CGI rendering models, which became visible in texture mappings not being fixed to the objects but moving with the camera view. Thus the investigations were executed with the test sequences depicted in FIG. 6, which were those sequences showing better quality. The test sequences were two sequences from the Cambridge University named 'Book' (top right, 400×300 pixels) and 'Tanks' (bottom left, 400×300 pixels), as well as a third sequence from the Auckland University named 'Seq1' (top left, 640×480 pixels).

A forth sequence named 'Colleagues' (bottom right, 520×316 pixels)—being shot with an own stereo camera system—was used to check the stability of the investigated algorithms.

This sequence does not provide ground truth data, however, and therefore had to be excluded from the numerical analysis of the results.

Figure 7:
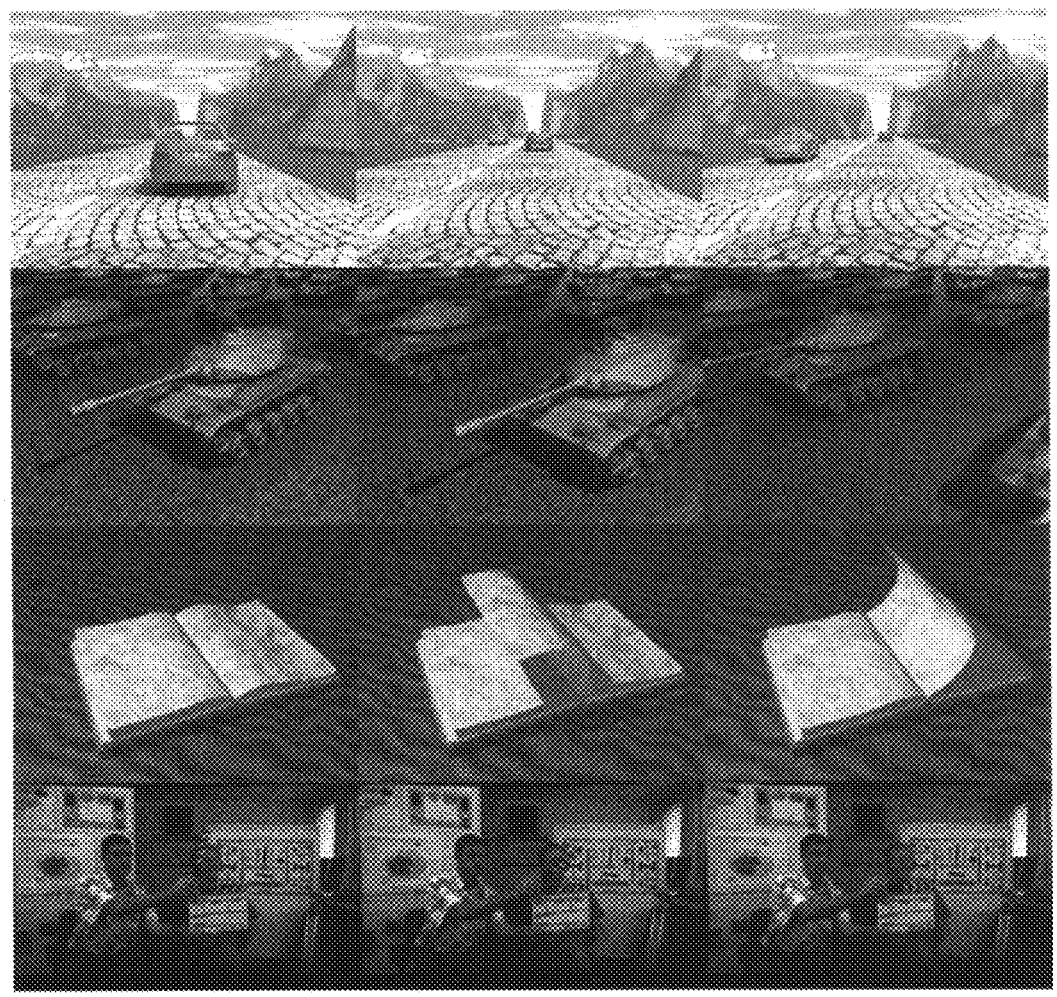
FIG. 7 gives an overview about the immanent motion within the test material of FIG. 6.

The motions within the four test sequence are representative for many practical cases by showing varying qualities. While the test sequences 'Seq1' and 'Tanks' contain a global camera movement—in 'Seq1' the camera follows the front car and in 'Tanks' the camera does an accelerating flight along the row of tanks—the sequences 'Book' and 'Colleagues' are shot with a static camera position—in 'Book' the page is turned over and in 'Colleagues' the flap is shut. FIG. 7 gives an overview about the immanent motion within the test material.

The goal of confidence evaluation is to determine the reliability of a disparity estimate, i.e. whether the disparity value represents an accurate point correspondence or not. Ideally the confidence values indicate directly the level of reliability of the corresponding disparity estimates, ranging from the smallest confidence values for unreliable statements to the largest confidence values for highly reliable statements.

The confidence calculation combines consistency, visibility, and matching errors to model the reliability state. So far, the calculation did only incorporate spatial aspects and did neglect any temporal caused influences upon these data. As a novelty a particular attention is paid to the spatio-temporal characteristics of the data sets.

The temporal change within the data sets is analyzed by means of the additionally introduced flow estimation, where flow maps describe the amount and the orientation of scene objects and scene movements. The flow information can be used to track scene objects in time by applying flow compensation and it allows for the detection of motion, which may be related to scene objects or global camera motions.

The spatio-temporal analysis of the data sets revealed a large discrepancy between static and dynamic scene regions, making evident previously unknown or unstated aspects. On one side it is clear that in the static regions of the pictures there is no temporal disparity change. These cases having no motion simply represent a resampled version of the same physical reality. On the other side the dynamic regions are much more difficult to be characterized, as the relation between the amount of disparity changes and the object motion is not unique.

Figure 8:
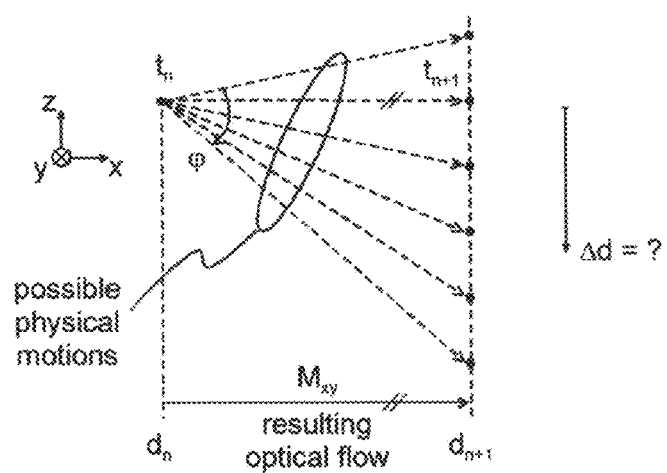
FIG. 8 visualizes existing uncertainty between optical flow and disparity change.

FIG. 8 visualizes the existing uncertainty between optical flow and disparity change Δd. Depicted is a top down view, the optical flow vector lies in the image plane and disparities d are equivalent to the depth z. The optical flow vector is only the projection of a 3D motion into the 2D image plane and thus excludes to conclude for the depth change. In the extreme case of a motion along the optical camera axis the optical flow would be zero although the disparity changes.

At the first impression these conditions may appear manageable, but the uncertainty between optical flow and disparity change is even further aggravated by the fact that Δd is dependent on the starting depth due to the hyperbolic relation between disparity and z-component given by the function $$d = f \cdot B \cdot \frac{1}{z} \quad \text{(iii)}$$

with $$z = [f; \infty]; d = [B; 0]$$

where f is the focal length and B the stereoscopic base-line, both measured in pixels. Dependent from the starting disparity $d_n$ the disparity change Δd can be determined by the relation $$\Delta d = \frac{\Psi \cdot d_n^2}{1 - \Psi \cdot d_n} \quad \text{(iv)}$$

with $$\Psi = \frac{M_{xy}}{f \cdot B} \cdot \tan\varphi \quad \text{(v)}$$

The angle φ determining the length of the optical flow vector $M_{xy}$ is one component ruling the disparity change which has been already identified in the previous figure. The second not yet discussed component influencing the disparity change is the start disparity $d_n$, as can be seen from equation (iv).

The two components simultaneously influencing the disparity changes make a conclusion unreliable. Furthermore, the camera parameters of focal length and base-line are missing. Even the introduction of a maximum limit for the angle φ equal to 60 degree, for example, does not really free up the situation and would improperly limit the degree of freedom for possible motions in front of the cameras.

In consequence, the further investigations concentrate upon those areas in the pictures which can be detected as static regions by analyzing the optical flow data.

The different algorithms examined can be categorized into two main approaches:

(a) Modifying confidence calculation involving optical flow information; and (b) Post-processing the confidence map using optical flow information.

While approach (a) changes the calculating of confidence value itself, the second approach (b) filters the confidence maps by improving or degrading the confidence value dependent on motion and disparity change information.

The confidence modification did mainly affect the static areas in the sequences as explained within the above description. The fundamental assumption for all manipulations has been that there is no disparity change allowed if no optical flow has been detected. The relation between the two values measured from the estimation results was used as an additional indicator for reliable or unreliable disparity estimates and led to the modification of the confidence map.

Thus the presence of large disparity changes in cases where the optical flow is small resulted in a degradation of the confidence value. And in the opposite situation, when the disparity change was zero and the optical flow confirmed a static area, the confidence value was improved.

While the flow information could be taken directly from the optical flow vector field M by defining all areas fulfilling the condition $$\sqrt{M_x^2 + M_y^2} \leq 1 \quad \text{(vi)}$$

as static regions, the disparity change Δd had to be calculated by means of the optical flow for applying motion compensation. This was executed according to $$\Delta d(x,y) = d_n(x,y) - d_{n-1}(x+M_x, y+M_y), \quad \text{(vii)}$$

where the optical flow vector field has to be the reverse flow estimation from frame n to frame n−1. This is required to ensure a match for every pixel within the currently processed frame n.

The details of the investigated confidence calculation approaches are handled in more detail in the following.

The direct confidence calculation was modified by supplementing the confidence determination with the additional data provided by the optical flow and disparity changes. The original confidence calculation uses the left-right consistency check to determine unreliable disparity results. Therefore, disparities are estimated for the two directions left-to-right and right-to-left and the difference between the two results forms the left-right consistency. In absence of further information the original confidence calculation was setting those disparities to not reliable for which the left-right consistency exceeded the value '2'. This results in salt and pepper leaks within the confidence map, which can be seen in the left column of FIG. 9.

The new algorithm exploits the optical flow information by trusting disparities even when exceeding the left-right consistency limit of two pixels in cases where the optical flow holds condition (vi) and the disparity change (vii) is not larger than '1'. Both limits were chosen to provide some more robustness and to eliminate the noise within the estimations.

Figure 9:
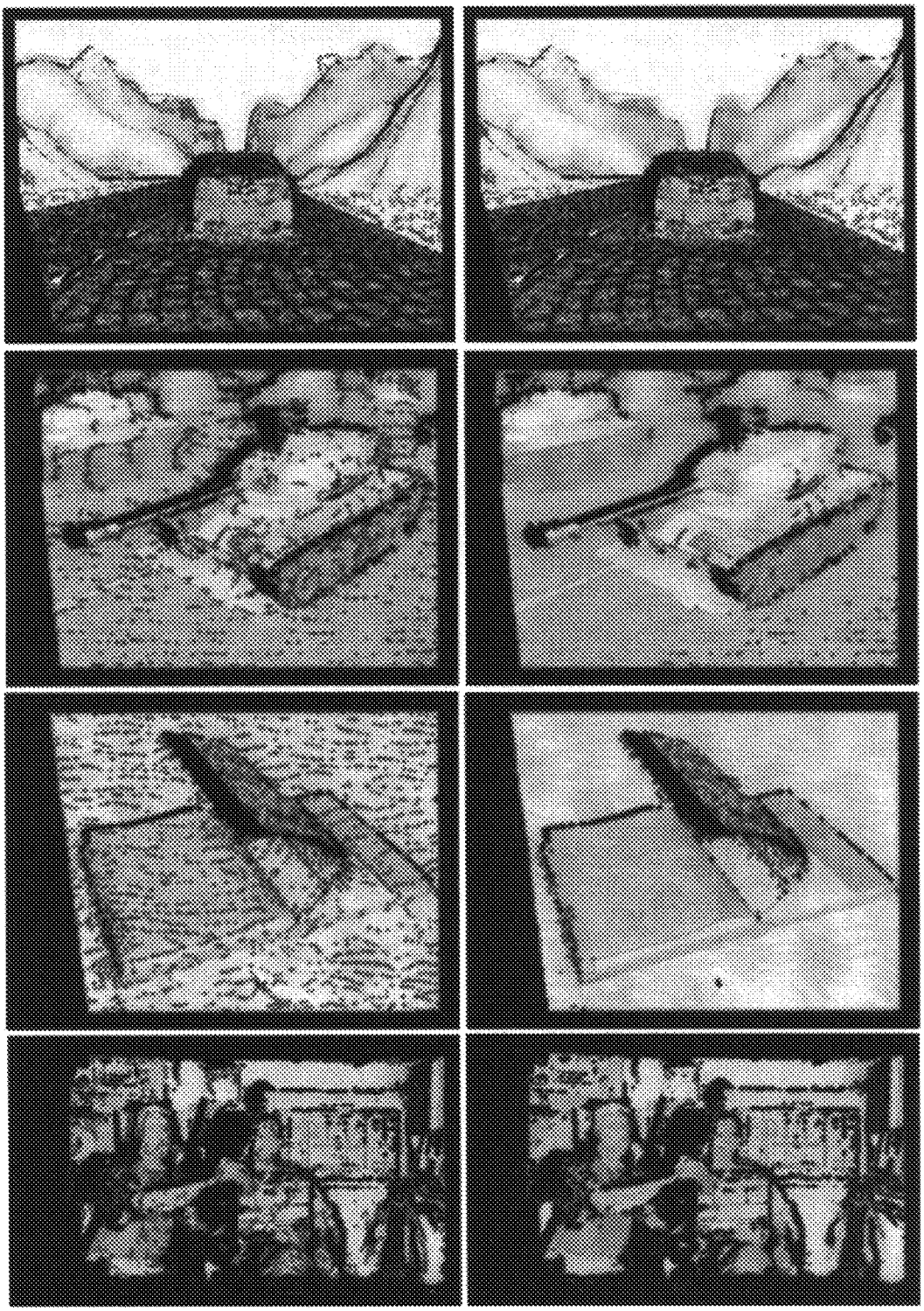
FIG. 9 shows confidence maps calculated for the test sequences.

The new confidence calculation closes the salt and pepper leaks within the confidence maps, which is documented with the changes shown in the right column of FIG. 9 depicting the results of the modified algorithm. The cleanest confidence maps are created for sequences with static cameras, which are 'Book' and 'Colleagues'. The 'Tanks' sequence itself is dominated by dynamic areas, but the example chosen depicts an image from the very beginning of the sequence where the camera motion just begins to accelerate and thus contains a larger amount of static regions. The 'Seq1' material shows less improvements in the consistency map, which are only present in the background of the image where the large distance to the objects lets any motion and disparity vanish.

The pictures also demonstrate the achieved robustness of the modified confidence calculation using motion data. The occlusions present in all sequences and visible as black areas with low confidence values in the confidence maps are preserved and in the most cases even better distinguishable from other erroneous estimation results.

Figure 10:
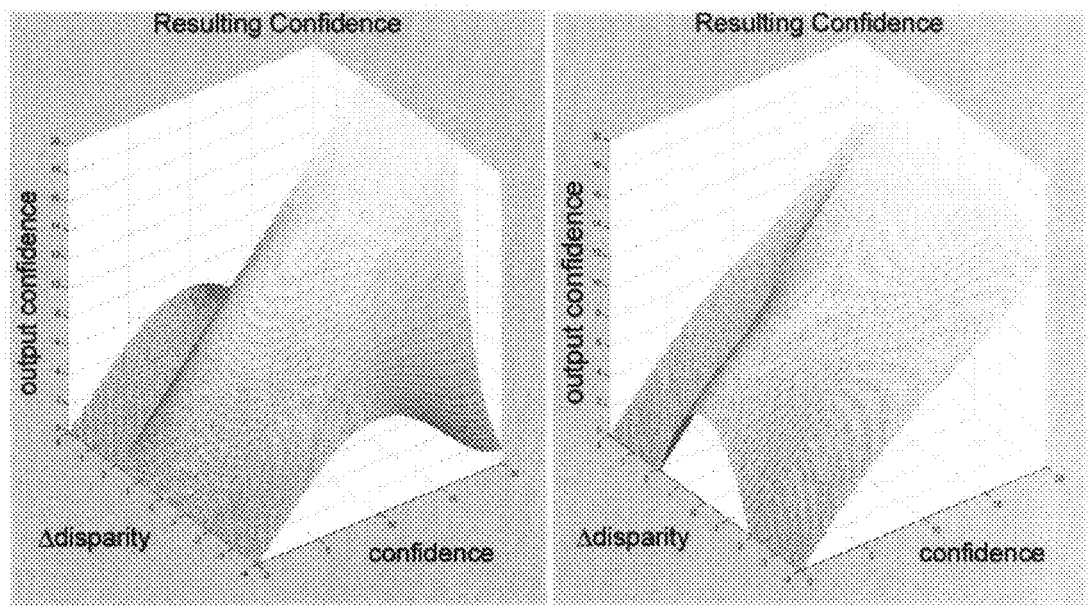
FIG. 10 shows the results of two different post-processing filters applied to confidence maps.

The second approach analyzed is the post-processing of confidence maps incorporating spatio-temporal information. Here two different methods have been investigated, which distinguish in the applied filter. The first filter primarily modifies those confidence values whose figures are placed in the center of the possible value range, while the second filter modifies all confidence values equally without preference. FIG. 10 shows the effect of the two filter methods. The vertical output confidence value is controlled by the detected disparity change Δd (x-axis) and the input confidence (y-axis). The confidence values in the plots are normed to the range [0, 20]. The first approach depicted on the left will be named (b1) center-weighted and the second approach on the right will be named (b2) overall-weighted in the following description.

Figure 11:
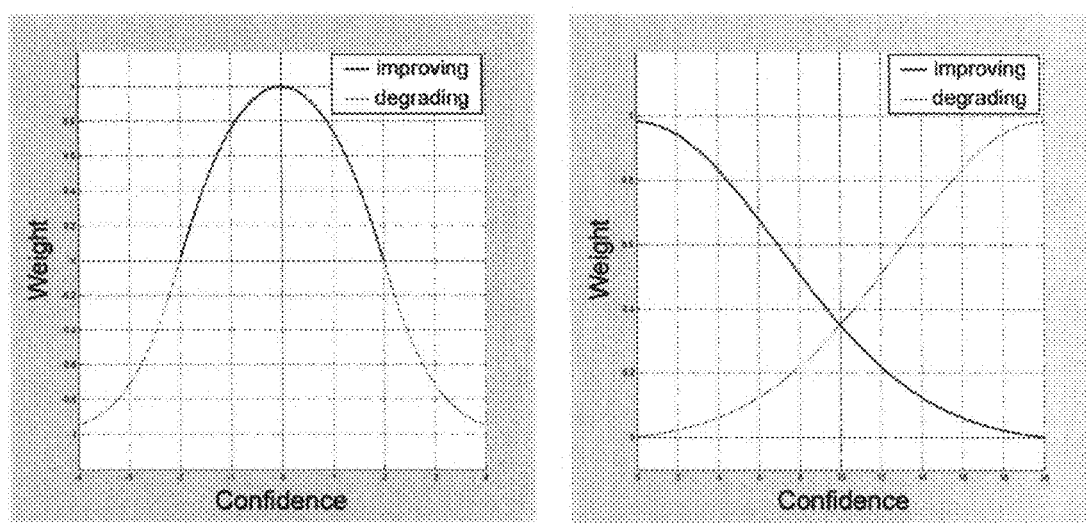
FIG. 11 illustrates the weight determination controlled by the detected disparity change and the input confidence value, respectively.

Both post-processing algorithms are based on a weight determination dependent on disparity change and input confidence value as depicted in FIG. 11. The weight controlled by the disparity change Δd on the left is formed by means of a composite function regulating the improvement and the degrading weights according to $$f(\Delta d) = \begin{cases} 1 - \Delta d^2; & |\Delta d| < \Delta D_{allowed} \\ \exp(1 - \Delta d^2) - 1; & |\Delta d| \geq \Delta D_{allowed}, \end{cases} \quad \text{(viii)}$$

where the limit of disparity change ΔD has been set to two pixels. The amount of degrading and improvement is additionally controlled by the input confidence as shown at the right side of FIG. 11. The confidence values in the plot are normed to the range [0, 20]. While large values (high quality) are degraded stronger than small values (bad quality), the opposite happens for the improvement where small values (low quality) are improved more than in the case of large input confidence values (high quality). This treatment prevents the confidence map from violating the valid range or from simply adding an offset value. The equations performing the confidence regulated weighting part are defined by $$g(c_{in}) = \begin{cases} \exp(-4/C_{max} \cdot c_{in}^2); & |\Delta d| < \Delta D_{allowed} \\ \exp(-4/C_{max} \cdot (c_{in} - C_{min})^2); & |\Delta d| \geq \Delta D_{allowed}, \end{cases} \quad \text{(ix)}$$

where $c_{in}$ is the input confidence value, ΔD as before is the disparity change limit set to two pixels and $C_{max}$ is the maximum confidence value allowed. The final weight is the multiplication of the equation (viii) and (iX) according to $$w(c_{in}, \Delta d) = f(\Delta d) \cdot g(c_{in}) \quad \text{(x)}$$

where each confidence value $c_{in}$ has its own disparity change value Δd.

So far the calculation for the confidence post-processing algorithms is the same. The weights for the center-weighted and the overall-weighted post-processing approaches are determined uniformly, while its assignment is different.

The center-weighted approach for determination of the weights is carried out according to $$c_{out} = [1 + w(c_{in}, \Delta d)] \cdot c_{in} \quad \text{(xi)}$$

and the overall-weighted approach according to $$c_{out} = c_{in} + \kappa \cdot C_{max} \cdot w(c_{in}, \Delta d), \quad \text{(xii)}$$

where different κ have been tested. The new confidence value $c_{out}$ is calculated by means of the weights and the input confidence $c_{in}$. The functional difference between the two approaches is depicted in FIG. 11.

Figure 12:
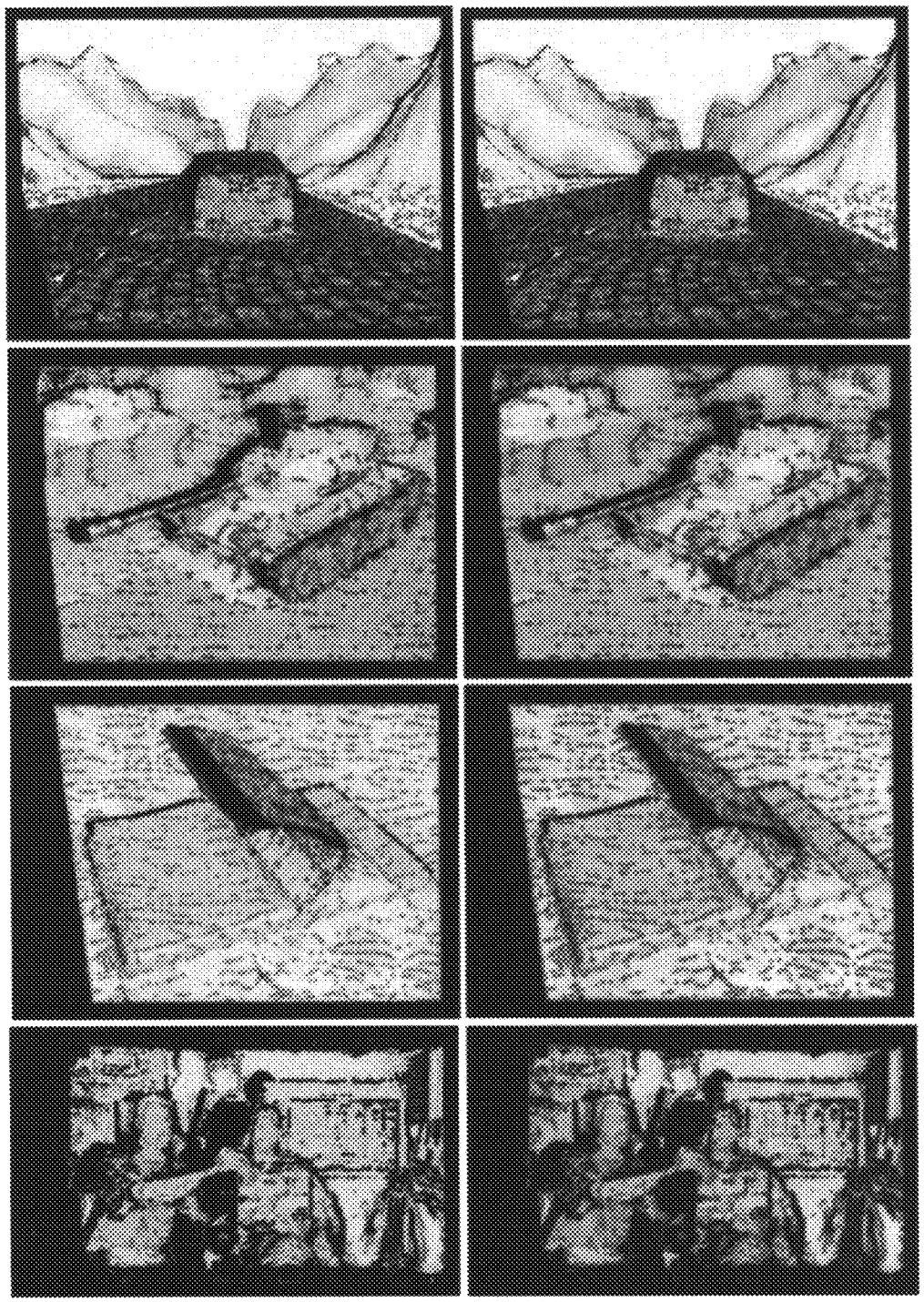
FIG. 12 depicts confidence maps generated with two different algorithms.

The confidence maps generated with the two algorithms are shown in FIG. 12. The left column shows the confidence map calculated by means of the center-weighted post-processing and the right column the confidence map calculated using the overall-weighted post-processing. An inspection of these results makes it clear that the salt and pepper leaks are still there, although their value has been increased to some amount. Comparing the two post-processing algorithms against each other it is found that the center-weighted approach shows lighter averages in the confidence map. A final evaluation, however, needs statistical investigations.

Figure 13:
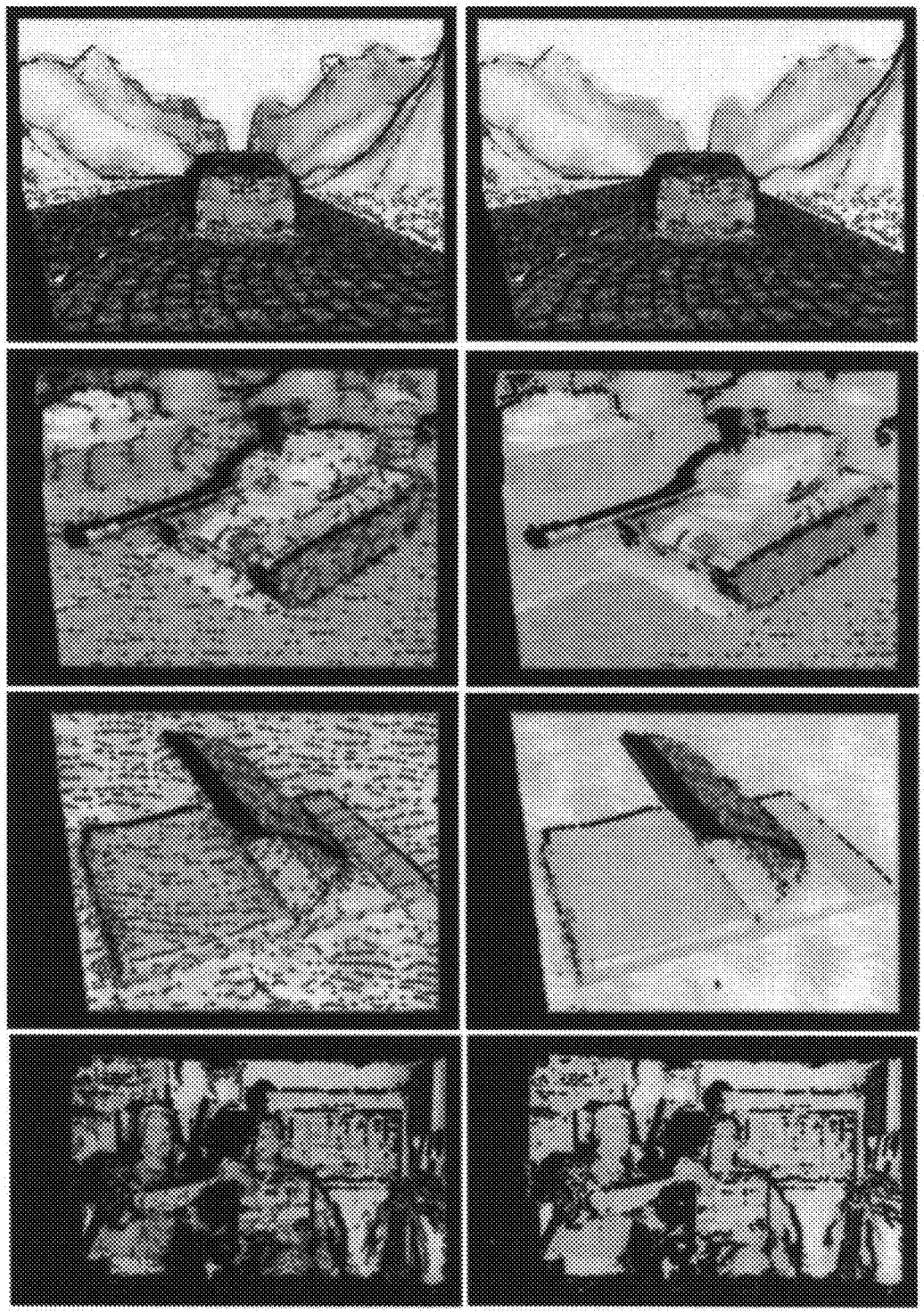
FIG. 13 depicts an original confidence map and a confidence map calculated using a combination of two algorithms.

In a further step the two main confidence improving algorithms were combined using the direct confidence calculation (a) with the center-weighted approach (b1). The resulting confidence maps can be inspected in FIG. 13. The left column shows the original confidence map and the right column the confidence map calculated using the combination of the direct calculated new confidence and center-weighted post-processing (a)+(b1). The combined confidence improvement algorithm fuses the characteristics of its single components by closing the pepper and salt leaks in combination with uprating the confidence in static areas.

Visual inspection is one part of the result evaluation. To finally judge the different outcomes the confidence values must be set into relation to the disparity errors. In order to evaluate the reliability of the confidence values, their range was split into intervals and for each interval the share of bad matches for all non-occluded (if given) and non-border pixels covered by the interval was determined. This shows if the intervals with high confidence values have a lower share of disparity errors and thus a higher share of accurate point correspondences.

The performance of the different approaches has been analyzed by means of the ground truth data provided in the test sequences 'Seq1', 'Tanks', and 'Book' by calculating the average outcomes over a sequence of 40 image pairs each. In the results a pixel is considered as a bad match if the disparity deviation between ground truth and estimate exceeds one pixel. The confidence maps were normalized to the range [0.0, 1.0], where '0.0' is an unreliable and '1.0' a highly reliable outcome.

For each confidence interval $I_k$, first the number of non-occluded pixels within the interval ($N_{nocc,k}$) is determined and, second, the number of bad matches ($N_{bad,k}$) among those non-occluded pixels. Therewith, for each interval the coverage, which is the ratio of $N_{nocc,k}$ and the total number of non-occluded pixels in the view, as well as the corresponding share of bad pixels, which is the ratio of $N_{bad,k}$ and $N_{nocc,k}$, can be calculated. The initial confidence interval is [1.0, 0.9], comprising the highest confidence values only. With each new interval its size is increased by 0.1. The initial interval creates a sparse disparity map and the last and largest interval [1.0, 0.0] a completely dense disparity map. The coverage of the non-occluded pixels for the latter interval is, therefore, 100%.

Figure 14:
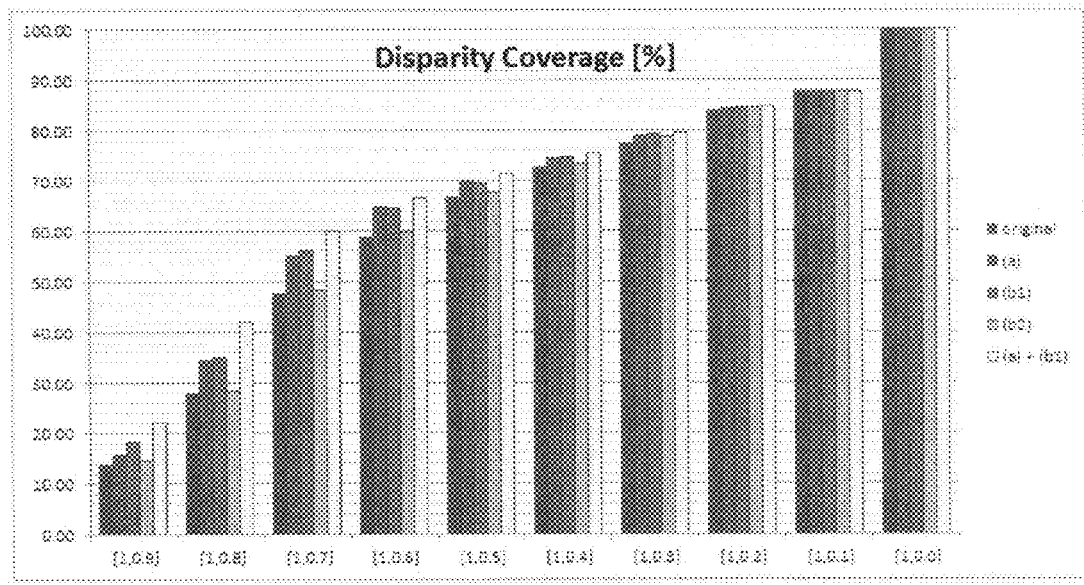
FIG. 14 depicts the disparity coverage in given confidence intervals for different confidence calculations.
Figure 15:
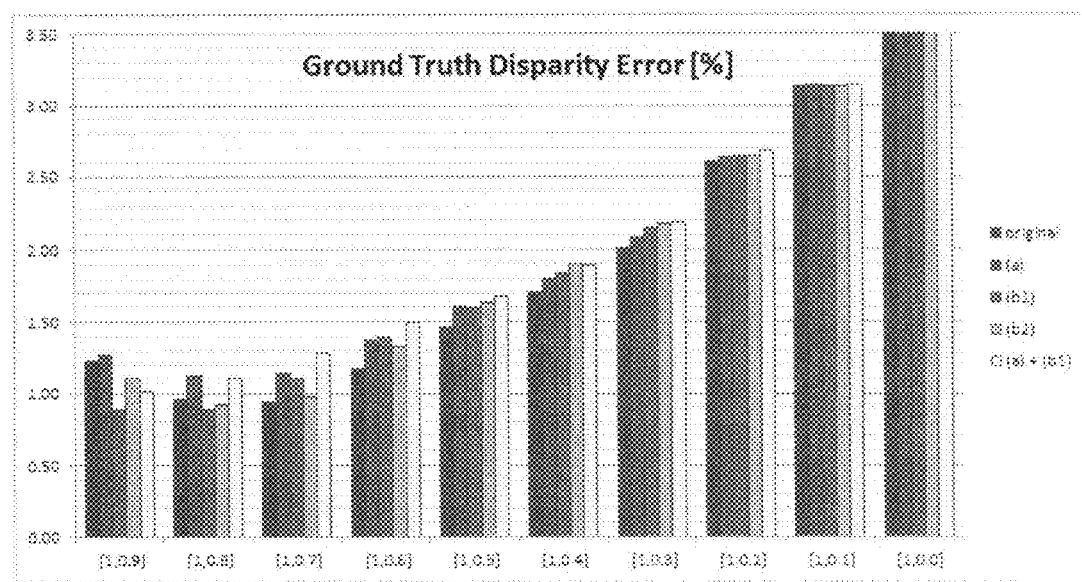
FIG. 15 depicts the share of pixels with a disparity deviation larger than one pixel in given confidence intervals for different confidence calculations.

Table 3 summarizes all results, allowing the direct comparison between all confidence calculation algorithms analyzed and their performance related to the original outcomes. FIGS. 14 and 15 provide a graphical view on the figures separated by coverage and error share.

The first observation made when looking at the results is a general coverage increase within the overlapping intervals $I_k$. All investigated algorithms create higher, i.e. better confidence values in average, causing a 'left shift' for the coverage distribution. Thus the percentage of better rated disparities is always higher, which confirms the observations made with the visual inspection of the confidence maps. Inspecting the corresponding error shares within the intervals $I_k$ allows checking if the confidence improvements lead to an overvaluing of the disparity estimation results. This is the case for the direct calculation (a), whose error rate is always higher than in the original confidence map. For the post-processing approaches (b1) and (b2) the error shares are much better for the very first interval [1, 0.9] and change to similar and worse values within the following two intervals. The error rate of the combined algorithm (a)+(b1) is only superior to the original result for the first interval, but it is remarkable that the coverage in this best quality interval is significantly increased from 13.72% to 22.26%, which comes close to a doubling. The coverage of the combined algorithm in general provides the best coverage increase, while the disparity errors are not similarly increased.

The results clearly prove that the selectivity of the confidence evaluation can be increased by incorporating spatio-temporal information. The significance of the confidence information is enhanced using optical flow for the direct calculation of confidence values as well as for algorithms applying this information later in a post-processing step. The combination of direct and post-processed confidence calculation using optical flow significantly improves the highest quality range.

Another finding is the complexity of motion tracking when based upon 2D data. The loss of the depth component in motion cannot be regained without additional information and leads to substantial ambiguities. However, the workaround of selecting static areas is a save method to successfully exploit spatio-temporal information even when only available in the 2D domain.

Figure 16:
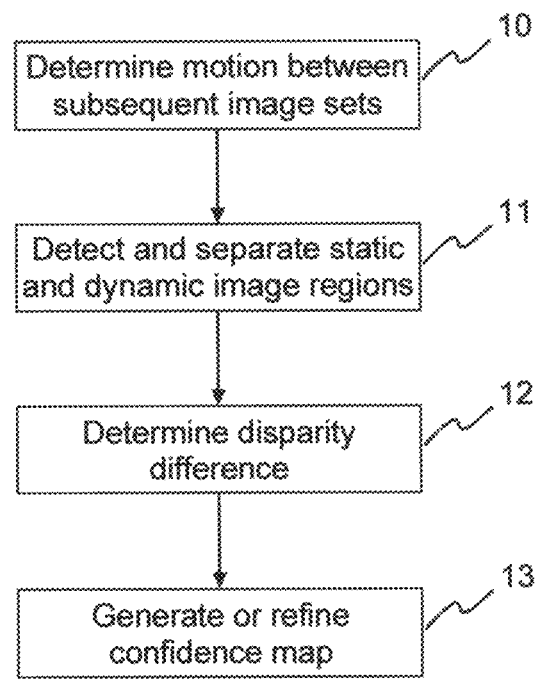
FIG. 16 schematically illustrates a method according to the invention for generating a confidence map.

FIG. 16 schematically illustrates a method according to the invention for generating a confidence map for a disparity map associated to a sequence of sets of two or more images. In a first step motion between at least two subsequent sets of two or more images is determined 10. Then, based on the determined motion information, static and dynamic regions in the images of the sets of two or more images are detected and separated 11. Subsequently a disparity change between a disparity value determined for a static region of a current image and a motion compensated disparity value of a previous image is determined 12. The result of this determination 12 is then taken into account for generating or refining 13 a confidence map.

TABLE 3

Coverage and share of bad pixels in a given confidence interval for different confidence calculations

| | Original | | direct calculation (a) | | center-weighted post-processing (b1) | | overall-weighted post-processing (b2) | | combined direct and post-processing (a) + (b1) | |
|---|---|---|---|---|---|---|---|---|---|---|
| Interval $I_k$ | Coverage [%] | Error [%] | Coverage [%] | Error [%] | Coverage [%] | Error [%] | Coverage [%] | Error [%] | Coverage [%] | Error [%] |
| [1, 0.9] | 13.72 | 1.23 | 15.54 | 1.28 | 18.26 | 0.89 | 14.41 | 1.11 | 22.26 | 1.01 |
| [1, 0.8] | 28.00 | 0.96 | 34.51 | 1.12 | 35.11 | 0.89 | 28.56 | 0.93 | 42.20 | 1.11 |
| [1, 0.7] | 47.77 | 0.94 | 55.08 | 1.15 | 55.98 | 1.11 | 48.56 | 0.98 | 60.08 | 1.28 |
| [1, 0.6] | 58.76 | 1.17 | 64.91 | 1.38 | 64.57 | 1.39 | 59.70 | 1.33 | 66.68 | 1.49 |
| [1, 0.5] | 66.71 | 1.46 | 70.04 | 1.60 | 69.66 | 1.60 | 67.76 | 1.63 | 71.29 | 1.68 |
| [1, 0.4] | 72.79 | 1.70 | 74.63 | 1.79 | 74.87 | 1.84 | 73.61 | 1.90 | 75.59 | 1.89 |
| [1, 0.3] | 77.51 | 2.01 | 78.96 | 2.08 | 79.29 | 2.15 | 78.82 | 2.17 | 79.55 | 2.18 |
| [1, 0.2] | 83.81 | 2.61 | 84.18 | 2.64 | 84.66 | 2.65 | 84.67 | 2.65 | 84.80 | 2.68 |
| [1, 0.1] | 87.64 | 3.13 | 87.69 | 3.14 | 87.63 | 3.13 | 87.64 | 3.13 | 87.70 | 3.14 |
| [1, 0.0] | 100.00 | 10.84 | 100.00 | 10.84 | 100.00 | 10.84 | 100.00 | 10.84 | 100.00 | 10.84 |

Figure 17:
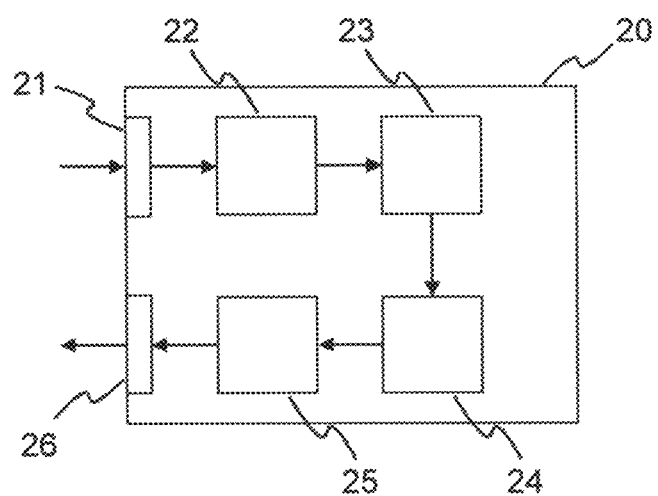
FIG. 17 depicts an apparatus adapted to perform the method of FIG. 16.

An apparatus 20 configured to perform the method according to the invention is schematically depicted in FIG. 17. The apparatus 20 comprises an input 21 for receiving a sequence of image sets. A motion determining unit 22 determines 10 motion between at least two subsequent sets of two or more images. A region detector and separator 23 detects and separates 11 static and dynamic regions in the images of the sets of two or more images based on the determined motion information. A determining unit 24 is configured to determine 12 a disparity change between a disparity value determined for a static region of a current image and a motion compensated disparity value of a previous image. The result output by the determining unit 24 is taken into account by a confidence map generator 25 for generating or refining 13 a confidence map. The resulting confidence map is output via an output 26. Of course, two or more of the various units may likewise be combined into single unit.

REFERENCES

[1] Datasets: .enpeda.—Environment Perception and Driver Assistance project; Multimedia Imaging Technology Portal hosted by The University of Auckland New Zealand; http://www.mi.auckland.ac.nz/index.php?option=com_content&view=article&id=44&Itemid=67
[2] Datasets: stereo videos with ground truth disparities; Graphics & Interaction Group, Computer Laboratory University of Cambridge; http://www.cl.cam.ac.uk/research/rainbow/projects/dcbgrid/datasets/
[3] B. K. P. Horn, Brian G. Schunck: "*Determining Optical Flow*", Artificial Intelligence Magazine Vol. 17 (1981), pp. 185-203
[4] B. Lucas and T. Kanade: "*An Iterative Image Registration Technique with an Application to Stereo Vision*", Proceedings of the 7th international joint conference on Artificial intelligence (IJCAI'81) (1981), pp. 674-679
[5] M. J. Black and P. Anandan: "*A framework for the robust estimation of optical flow*", Fourth International Conference on Computer Vision (ICCV)(1993), pp. 231-236
[6] A. Bruhn, J. Weickert and C. Schnorr: "*Lucas/Kanade meets Horn/Schunck: combining local and global optical flow methods*", International Journal of Computer Vision Vol. 61 (2005), pp. 211-231
[7] The Middlebury Computer Vision Pages, The Optical Flow Page, an evaluation of optical flow algorithms (presented at ECCV 2006) http://vision.middlebury.edu/flow/
[8] D. Sun, S. Roth, J. P. Lewis, and M. J. Black: "*Learning Optical Flow*", European Conference on Computer Vision (ECCV)(2008), pp. 83-97
[9] D. Sun, Stefan Roth, M. J. Black: "*Secrets of optical flow estimation and their principles*", IEEE Conference on Computer Vision and Pattern Recognition (CVPR) (2010), pp. 2432-2439
[10] T. Brox, A. Bruhn, N. Papenberg, and J. Weickert: "High accuracy optical flow estimation based on a theory for warping", European Conference on Computer Vision (ECCV) (2004), pp. 25-36

The invention claimed is:

1. A method for generating a confidence map for a disparity map associated to a sequence of sets of two or more images, the method comprising:
   determining motion between at least two subsequent sets of two or more images;
   detecting and separating static and dynamic regions in the images of the sets of two or more images based on the determined motion information;
   determining a disparity value for a static region in a current image;
   determining a motion compensated disparity value for said static region in a previous image;
   determining a disparity change between the disparity value and the motion compensated disparity value; and
   generating or refining a confidence map by increasing a confidence value for said static region if the determined disparity change is below a threshold or by applying a filter to confidence values of the confidence map, wherein output confidence values of the filter are controller by input confidence values and the determined disparity change.

2. The method according to claim 1, wherein the motion between at least two subsequent sets of two or more images is described by optical flow maps.

3. The method according to claim 1, wherein the filter primarily modifies those confidence values whose figures are located in a central range of a value range of the confidence values.

4. The method according to claim 1, wherein the filter modifies all confidence values equally without preference.

5. An apparatus for generating a confidence map for a disparity map associated to a sequence of sets of two or more images, comprising:
   a processor and an associated memory configured to:
   determine motion between at least two subsequent sets of two or more images;
   detect and separate static and dynamic regions in the images of the sets of two or more images based on the determined motion information;
   determine a disparity value for a static region in a current image;
   determine a motion compensated disparity value for said static region in a previous image;
   determine a disparity change between the disparity value and the motion compensated disparity value; and
   generate or refine a confidence map by increasing a confidence value for said static region if the determined disparity change is below a threshold or by applying a filter to confidence values of the confidence map, wherein output confidence values of the filter are controller by input confidence values and the determined disparity change.

6. The apparatus according to claim 5, wherein the motion between at least two subsequent sets of two or more images is described by optical flow maps.

7. The apparatus according to claim 5, wherein the filter is adapted to primarily modify those confidence values whose figures are located in a central range of a value range of the confidence values.

8. The apparatus according to claim 5, wherein the filter is adapted to modify all confidence values equally without preference.

* * * * *